United States Patent Office

3,560,425
Patented Feb. 2, 1971

3,560,425
PARTICULATE BLEND OF POLYACRYLONITRILE AND A LATENT SOLVENT
Leon E. Wolinski, Buffalo, N.Y., assignor to E. I. du Pont de Nemours and Company, Wilmington, Del.
No Drawing. Filed Dec. 22, 1967, Ser. No. 692,692
Int. Cl. C08f 45/46
U.S. Cl. 260—29.6                     3 Claims

ABSTRACT OF THE DISCLOSURE

Dry blends of acrylonitrile polymer and a latent solvent such as dimethyl sulphoxide-ethylene glycol or dimethyl sulphoxide-water, the blends being melt extrudable.

PRIOR ART

Various systems of preparing shaped articles of acrylonitrile polymer are well known in the patent literature. Typical of such patents are British Pat. No. 887,008 and the following U.S. Pats. Coxe 2,585,444; Rothrock 2,585,499; and Bechtold 2,846,727.

BACKGROUND

It is known in the art that acrylonitrile polymers, particularly those having an acrylonitrile content of 75% or more by weight, are not thermoplastic and therefore are not amenable to shaping by melt extrusion. Formation of shaped structures by casting solutions of the acrylonitrile polymer in a suitable solvent is limited to low solids content solutions because of the high viscosity obtained with the high molecular weight polymers. The forming of a dispersion of the polymer in an aqueous solvent metal salt system has also been proposed and this provides a means of shaping desired structures, but this has the disadvantage of having to remove the metal salt by washing the shaped structure. Thus the available methods for providing shaped structures of an acrylonitrile polymer have definite shortcomings.

SUMMARY OF THE INVENTION

In accordance with the present invention, dry blends of acrylonitrile polymer are provided. These are composed of particulate acrylonitrile polymer and a latent solvent system in such amounts as to provide a free flowing blend. The blend is formed by mixing from 40 to 70 parts by weight acrylonitrile polymer, having an acrylonitrile content of at least 75 percent by weight and a bulk density no greater than about 0.5 gram per cubic centimeter (g. per cc.) with from 30 to 60 parts by weight of a latent solvent system for the acrylonitrile polymer, at a temperature in the range of −70° C. to 100° C. Thereafter the resulting dry blend is melt extruded at an elevated temperature into the shaped structure. The solvent is thereafter removed from the shaped structure. In this manner, shapes of acrylonitrile polymer are obtained by melt extrusion.

The acrylonitrile polymers employed in the present discovery are presently known, as are methods by which such polymers can be produced. The prior art patents cited hereinbefore can be referred to for such well known details. In general, however, suitable acrylonitrile polymers may be prepared by any convenient method, such as by batch, bulk, solution, emulsion or suspension polymerization. A preferred method is the emulsion technique using a redox type catalyst. The polymer is isolated in particulate form by filtration or centrifugation, by lowering the temperature of the dispersion or by the addition of a non-solvent for the polymer, such as an aliphatic alcohol. Polymers that may be prepared and used include homopolymers of acrylonitrile as well as copolymers with such monomers as styrene, methyl styrene, acrylic and alkacrylic ester monomers such as the alkyl acrylates and alkyl alkacrylates (methacrylate, ethyl acrylate, and methyl methacrylate), methacrylonitrile, vinyl stearate, vinyl benzoate, vinyl acetate, vinyl chloride and the lower olefins. For purposes of this discovery, it is preferred that the acrylonitrile polymer have an acrylonitrile content of at least 75 percent by weight and have a bulk density no greater than 0.5 gram per cubic centimeter.

To form the dry blend, the polymer particles are of small size, and preferably the polymer is ground sufficiently to pass standard 200 mesh screen. Thereafter it is blended, in an amount of 40 to 70 parts by weight, with 30 to 60 parts by weight of a latent solvent system for the acrylonitrile polymer.

Typical latent solvent systems that can be used include dimethyl suphoxide/water and dimethyl sulphoxide/ethylene glycol. The dimethyl sulphoxide is present in major amount, i.e. 60 to 95 percent of the solvent, and may be adjusted in amount to produce blends of desired flowability, depending on the polymer characteristics and the like. Other suitable solvent systems can be found among the known acrylonitrile polymer solvents.

The solvent system and particulate polymer are thoroughly mixed in an appropriate type of mixing apparatus, such as a blender, to give a free flowing blend which can be fed directly into a melt extruder and shaped into the desired structure. For the most part the dry blends have a bulk density in the range of 0.2 to 0.3 g./cc. Dry blends having a bulk density up to about 0.5 g./cc., and as low as about .05 g./cc. can be used. The dry blend may be formed (i.e. be mixed) at a temperature in the range of −70° C. to 100° C. High speed mixing is particularly advantageous at elevated temperatures to avoid local high concentration of solvent and resultant agglomeration. It is preferred to carry out the mixing at a temperature in the range of −25° C. to 50° C.

The dry blend can be extruded to any desired shape such, for example, as a fiber or a film. Conventional apparatus and operating conditions are employed for extrusion with the exact conditions depending on the particular composition used. Generally extrusion temperature of about 170° to 190° C. is used. The product of extrusion is a gel, for example a gel film, due to its solvent content. That solvent and other volatiles present, if any, can be readily removed by heating at the same conditions that are presently known for removing solvents from gel structures.

The invention will be described further by means of the following examples in which the details are given by way of illustration and not by way of limitation.

EXAMPLE 1

A 50 percent solids mixture is made by premixing 37.5 g. of dimethyl sulphoxide and 12.5 g. of ethylene glycol and adding this premixture slowly with agitation to 50 g. of polyacrylonitrile, having an inherent viscosity of 1.56 (measured on a 0.5 weight percent solution thereof in dimethyl sulphoxide at 30° C.), in a Hobart mixer. The acrylonitrile polymer is, prior to mixing, ground sufficiently to pass through 200 mesh screen. The mixture is agitated for 5 minutes at a temperature of 18° C. to yield a free flowing dry powder having a bulk density of about 0.3 g. per cu. cm. Melt extrudability of this free flowing blend is established by extruding the material in a melt indexer at 175° C. to give 10.9 g. of extrudate in 15 seconds. Another portion of the dry blend is extruded at 175° C. into a gel film. The resulting gel film can be heated under tension at 170 to 180° C. to remove volatile solvent.

EXAMPLE 2

A 40 percent solids, free flowing powder which passes through a 200 mesh screen is obtained by chilling 4 pounds of an acrylonitrile copolymer comprising 93.7% by weight of acrylonitrile, 6% of methacrylate and 0.3% of sodium styrene sulphonate, having an intrinsic viscosity of 1.5, in a 90/10 by weight dimethyl sulphoxide/water solvent system to −70° C., then mixing the powder in a Hobart mixer at 12° C. with 6 pounds of cold (−70° C.) dimethyl sulphoxide. The resulting dry blend, having a bulk density of about 0.25 g. per cu. cm., is extruded at 175° C. to give a brilliantly clear gel film.

EXAMPLE 3

Free flowing dry blends, having a bulk density of 0.3 g./cc. and 0.35 g./cc., respectively, are obtained with the polymer of Example 2 at 50 percent and 60 percent solids following the mixing technique described in that example. Likewise these higher solids blends are melt extrudable at 175° C. to give clear tough films. It is also observed that these higher solids blends can be shaped by rolling. The 50% solids blend is milled at 110° C. to give a clear, tough film; the 60% solids blend under the same condition likewise gives a very tough film which is somewhat opaque.

From the foregoing discussion and description it is apparent that it provides an improved method of making acrylonitrile polymer shaped structures, such as films, by the desirable technique of melt extrusion. Thick films can be readily provided in that a lesser amount of residual solvent must be removed. The shaped structures may be utilized as such, or they may be modified as by stretching either uniaxially or biaxially. They can be subjected to various adherability treatments such as the flame treatment, electrical discharge treatment and the like. Furthermore, various coating materials can be applied to the shaped structures such as coatings for special utilities. Other changes will be apparent to the artisan whereby the discovery herein can be modified without departing from its scope.

What is claimed is:

1. A free flowing particulate blend, having a bulk density within the range of 0.05 to 0.5 gram per cc., said blend comprising acrylonitrile polymer containing at least 75 percent by weight of acrylonitrile and a latent solvent therefor, said polymer being present in said blend in an amount of about 40 to 70 parts by weight and said latent solvent being present in an amount of about 30 to 60 parts by weight, and consisting of 60 to 95% dimethyl sulphoxide with the remainder being selected from the group consisting of ethylene glycol and water.

2. A free flowing blend in accordance with claim 1 in which said solvent is composed of dimethyl sulphoxide and ethylene glycol.

3. A free flowing blend in accordance with claim 1 in which said solvent is composed of dimethyl sulphoxide and water.

References Cited

UNITED STATES PATENTS

| | | | |
|---|---|---|---|
| 2,846,727 | 8/1958 | Bechtold | 260—2.5 |
| 3,020,265 | 2/1962 | Tietz | 260—30.8DMSO |
| 3,088,793 | 5/1963 | Knudsen et al. | 264—210F |
| 3,094,502 | 6/1963 | Farago | 260—30.8DMSO |
| 3,180,845 | 4/1965 | Knudsen et al. | 260—30.8DMSO |
| 2,858,288 | 10/1958 | Ehlers | 260—30.8DMSO |
| 3,313,758 | 4/1967 | Apperson | 260—29.6 |

MORRIS LIEBMAN, Primary Examiner

T. MORRIS, Assistant Examiner

U.S. Cl. X.R.

260—30.8